United States Patent [19]

Focke et al.

[11] 3,837,504
[45] Sept. 24, 1974

[54] DEVICE FOR LIFTING CONTAINERS IN CONNECTION WITH A PACKING MACHINE

[75] Inventors: Heinz Focke, Verden/Aller; Hugo Mutschall, Kreis Verden/Aller, both of Germany

[73] Assignee: Focke & Pfuhl, Verdan/Aller, Germany

[22] Filed: Mar. 26, 1973

[21] Appl. No.: 344,662

[52] U.S. Cl. ............................................. 214/6 BA
[51] Int. Cl. ............................................. B65g 57/30
[58] Field of Search ................................. 214/6 BA

[56] References Cited
UNITED STATES PATENTS

| | | | |
|---|---|---|---|
| 2,997,187 | 8/1961 | Burt | 214/6 BA |
| 3,220,570 | 11/1965 | Swanson et al. | 214/6 BA |
| 3,545,367 | 12/1970 | Smith et al. | 214/6 BA |
| 3,568,860 | 3/1971 | Rawlins | 214/6 BA |

FOREIGN PATENTS OR APPLICATIONS
409,761  10/1966  Switzerland ...................... 214/6 BA

*Primary Examiner*—Robert J. Spar
*Assistant Examiner*—Lawrence J. Oresky
*Attorney, Agent, or Firm*—Sughrue, Rothwell, Mion, Zinn & Macpeak

[57] ABSTRACT

Apparatus is described for stacking a plurality of containers upon removal from a conveyor. The stacking apparatus comprises a wheel located at each side adjacent one end of the conveyor, each wheel having a plurality of rods slidingly affixed thereto adjacent the periphery of the wheel. As the wheels are rotated, a rod engages each side of a container or plurality of containers to lift them from the container. Further rotation causes the rods to eventually become disengaged from the containers. The thus raised containers are then supported by those containers raised by subsequent rods.

6 Claims, 2 Drawing Figures

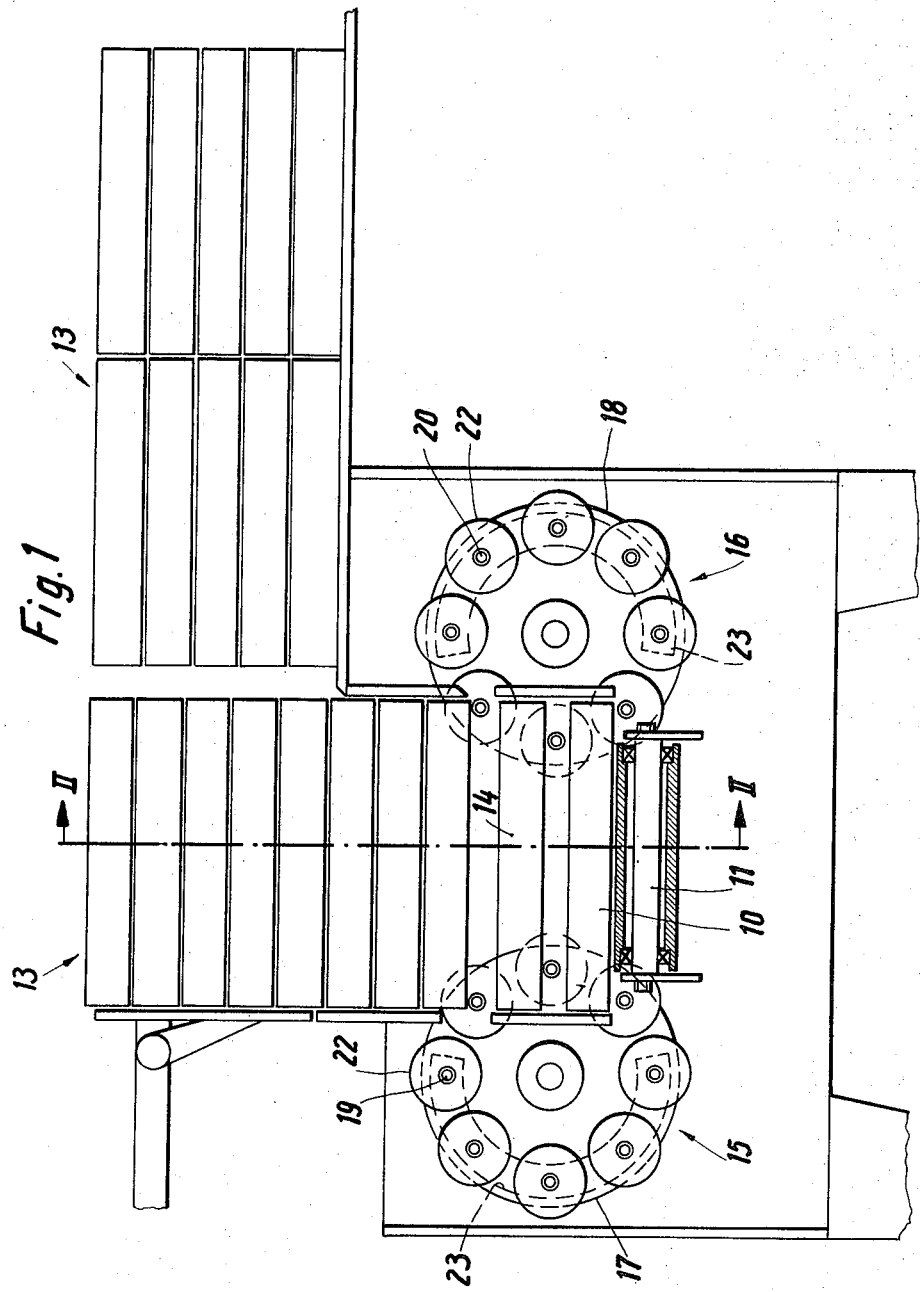

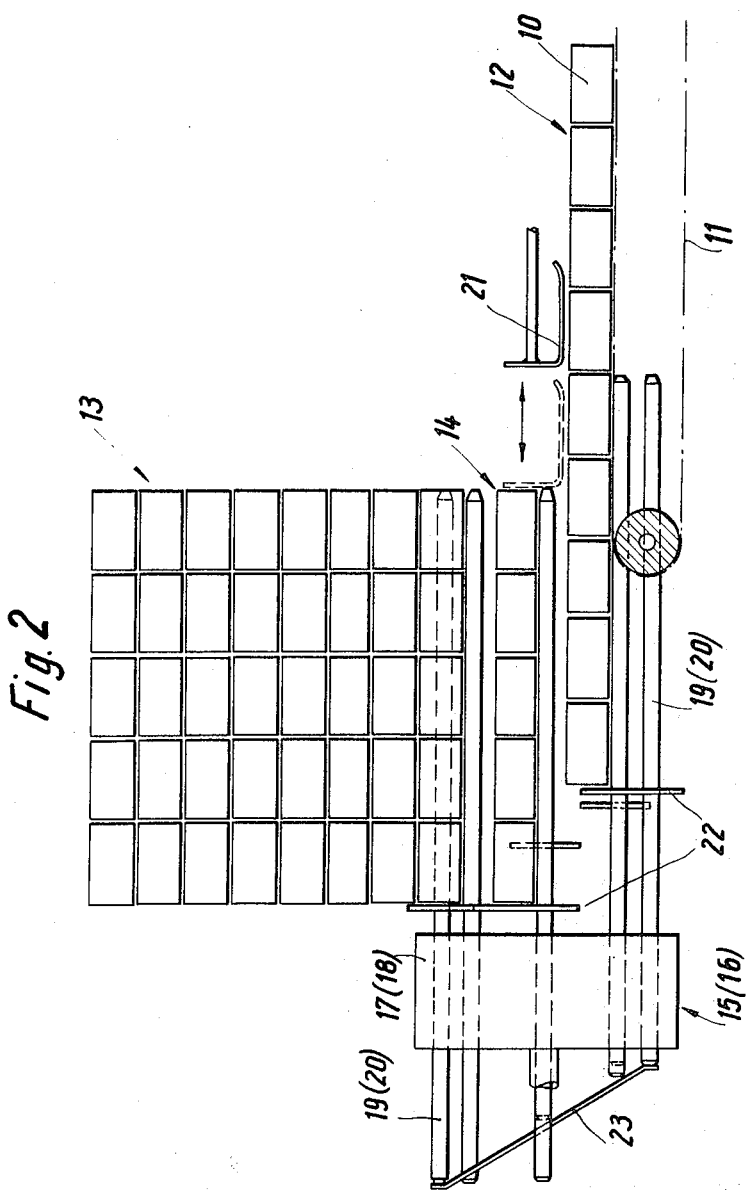

DEVICE FOR LIFTING CONTAINERS IN CONNECTION WITH A PACKING MACHINE

BACKGROUND OF THE INVENTION

1. Field of the Invention

The invention relates to a device for lifting objects, more particularly containers, in connection with a packing machine, preferably to form groups from the containers being delivered in a series row on a conveyor belt.

2. Prior Art

In the packing industry there are many instances when it may be necessary to lift containers or the like. It is particularly advantageous to form individual groups of containers by lifting containers or batches of containers, for example, when forming stacks of containers. The containers being delivered are generally arranged in a series row either in close succession to one another or spaced apart from each other.

SUMMARY OF THE INVENTION

The object of the invention is to form groups of objects, or containers, where each layer in the group consists of a plurality of containers disposed adjacent to each other in a particular direction. Accordingly, the invention is intended to be particularly suitable for use with long containers.

The device according to the invention is characterized in that, by means of a lifting device adapted to grip on its underside at least one of the containers being delivered, it is possible to lift the container and convey it to an already partially formed group by raising it from below.

Preferably, two lifting devices are provided to grip a plurality of adjacent containers. These lifting devices, which are preferably in the form of a rotating assembly provided with lifting rods, fasten onto a batch of containers, gripping the individual containers close to their ends, from below, and lifting them until they reach the underside of the partial group already formed. The batch of containers separated in this way from the containers being delivered, is combined with the partial group by further lifting. This is achieved by displacing the batch of containers until it reaches the underside of the partial group and then combining the batch and the partial group by raising the latter. The group of containers, or partial group, is supported exclusively by the lifting device until the former is removed.

By constructing the lifting device in the form of a rotating assembly, the device may be operated continuously, i.e., containers may be continuously delivered in series rows, and batches of containers may be continuously removed from the row and conveyed to the group of containers.

Other features of the present invention will be made apparent from the following detailed description of the preferred embodiment thereof made with reference to the accompanying drawings in which:

BRIEF DESCRIPTION OF THE DRAWINGS

FIG. 1 is a diagrammatic view of the device showing the front side of the container lifting device, FIG. 2 is a section along the line II—II of FIG. 1 showing a partial side view of the container lifting device.

DESCRIPTION OF THE PREFERRED EMBODIMENTS

In the case of the embodiment represented, the general object is to form groups 13 from the containers 10, which are delivered in a series row 12 on a conveyor 11 in the form of a belt. The containers 10 are long and extend the length of one side of the group 13 (see FIG. 1).

The groups 13 are formed by the successive lifting of batches of containers, which are separated from the row of containers 12. The batches 14 are lifted in succession and conveyed to the underside of the existing part of the group 13 already formed. The group 13 is raised each time by an appropriate amount to receive the next batch 14 of containers.

Lifting devices, in the case of the embodiment, two lifting devices 15 and 16, are provided to remove the batches 14 from the series row 12, and to convey the containers 10 to the group 13. These two lifting devices each consist of a rotating assembly 17 or 18, which is provided with lifting rods 19 or 20, projecting on one side of the rotating assembly. The lifting rods 19 or 20, which project from one side of the rotating assembly 17,18, are arranged in such a manner that they grip at least partially the underside of the containers 10, or the batches 14, close to the ends of the containers and lift the same by means of the rotation of the rotating assembly 17 or 18. For this reason, the two rotating assemblies 17 and 18 function in synchronism and with synchronized lifting rods 19 and 20 so that the containers 10 supported by their ends on the lifting rods 19 and 20 are arranged approximately horizontally. The free, usable length of the rods 19 and 20 determines the number of containers 10 to be picked up in one batch 14.

The lifting rods 19 and 20 are evenly circumferentially spaced on the rotating assemblies 17 and 18. The two lifting devices 15 and 16 are arranged as an extension of the conveyor 11 on one side of the group 13 to be formed, such that during the rotation of the rotating assemblies 17 and 18, the lifting devices 19 and 20 periodically enter the region of the group 13. The lifting process is such that the rotating assemblies 17,18, which rotate in the direction indicated by the arrows in FIG. 1, each grip from below a batch 14 of containers and remove the batch from the series row 12. During the continued lifting movement the gripped container batch 14 is raised to the level of the underside of the group 13 and combined with the same. The combining process is carried out in such a manner that the lifting rods 19 and 20 of the previously gripped batch 14 move out of the area of the group 13. As a result, the lower batch of containers in the group 13 is released and this drops down onto the next batch 14. The group 13 is then raised until the lifting rods 19 and 20 supporting this group 13, also leave the region of the group 13.

In the embodiment shown, the rotating assemblies 17 and 18 and the lifting rods 19 and 20 are set at continuous operation. For this reason, the lifting rods 19 and 20 are adapted to be axially displaceable. Whenever the lifting rods 19 or 20 are disposed in the lower region of the rotating assemblies 17,18, they are swung out in the direction of the container 10 being delivered on the conveyor 11. In this way, the batch 14 of containers to be picked up, is gripped before this batch 14 reaches its position under the group 13. The batch 14 gripped by the extended lifting rods 19 and 20 is immediately raised. The batch of containers continues to move forwards during the lifting movement until it is in alignment with the group 13. In the case of the embodiment represented, a reciprocating slide bar 21 is provided for this purpose. At the beginning of the upward movement the slide bar 21 grips the ends of the batch 14, or the lifting rods 19, 20, supporting the same, and pushes them in an axial direction to the end position. The batch of containers is raised in this end position until it reaches the group 13. To determine the exact relative position of the batches 14, the lifting rods 19 and 20 are provided with detent plates 22 against which abuts the row 12 of containers being delivered.

The position of the lifting rods 19 and 20 relative to the rotary elements 17 and 18 is determined by a cam 23, which extends over a part of the movement of the lifting rods 19 and 20 (FIG. 1). The free ends of the lifting rods 19, 20, facing away from the containers 10 return at the cam 23 to the extended lower position (FIG. 2, lower lifting rods). As stated, the lifting rods 19 and 20 are returned to the starting position by means of the slide bar 21.

What is claimed is:

1. Apparatus for lifting and stacking containers comprising:
   a. a horizontal conveyor which transports a single layer of containers toward a lifting device,
   b. a lifting device located at each side of one end of said conveyor, each of the lifting devices having a wheel rotatable about an axis parallel to the longitudinal axis of the conveyor, a plurality of rods slidably affixed to and extending from said wheel adjacent its periphery toward the opposite end of said conveyor such that each of said rods may move along its longitudinal axis with respect to said wheel wherein as the wheels are rotated, one rod from each wheel contacts the underside of the containers and lifts said containers from said conveyor before said containers reach the end of said conveyor, and
   c. means to move said rods along their longitudinal axis with respect to said wheels.

2. The apparatus of claim 1, wherein the means to move said rods comprises a reciprocating slide which engages the distal end of said rods as they lift the containers from said conveyor to move the container and rod toward the wheels to the end position of the conveyor.

3. The apparatus of claim 2 wherein said means to move said rods also comprises means to move the rods toward the opposite end of the conveyor after they have been displaced toward the wheels prior to engaging said containers.

4. The apparatus of claim 3 wherein said means to move said rods toward the opposite end of the conveyor comprises a stationary cam member which engages the end of the rods protruding from the side of the wheels opposite the end of the conveyor during a portion of the rotation of the wheels.

5. The apparatus of claim 1 wherein the rods support the weight of the stacked containers during a portion of the rotation of the wheels.

6. The apparatus of claim 1 wherein each of said rods has a detent plate affixed thereto to limit the travel thereon of the containers.

* * * * *